United States Patent

Kang

[11] Patent Number: 5,729,195
[45] Date of Patent: Mar. 17, 1998

[54] SYSTEM FOR PREVENTING SCATTERING OF FRONT GLASS PIECES DURING A VEHICLE ACCIDENT

[75] Inventor: Jung-Koo Kang, Kyungki-Do, Rep. of Korea

[73] Assignee: Hyundai Motor Company, Seoul, Rep. of Korea

[21] Appl. No.: 773,701

[22] Filed: Dec. 27, 1996

[30] Foreign Application Priority Data

Dec. 27, 1995 [KR] Rep. of Korea ............ 95-59722

[51] Int. Cl.$^6$ ............................................. B60Q 1/00
[52] U.S. Cl. ........................ 340/436; 180/271; 180/274; 280/748
[58] Field of Search ........................ 340/436, 426, 340/425.5; 180/271, 274; 280/748, 749

[56] References Cited

U.S. PATENT DOCUMENTS

| | | |
|---|---|---|
| 3,764,178 | 10/1973 | Krings et al. .............. 296/84.1 |
| 4,724,022 | 2/1988 | Armstrong .................. 156/99 |
| 4,958,142 | 9/1990 | Sawyers ..................... 340/426 |

*Primary Examiner*—Jeffery Hofsass
*Assistant Examiner*—Ashok Mannava
*Attorney, Agent, or Firm*—Christie, Parker & Hale, LLP

[57] ABSTRACT

An improved system for preventing scattering of glass pieces during a vehicle accident, which is capable of preventing scattering of glass pieces when a vehicle accident occurs, whereby it is possible to protect a driver or passengers in the vehicle from being injured due to the scattering glass pieces. The system includes a high viscosity liquid tank disposed in an engine room and filled with high viscosity liquid, a motor for pumping the high viscosity liquid from the high viscosity liquid tank, a collision detection sensor for detecting a collision of a vehicle, a controller for controlling the motor, and a plurality of spraying nozzles for spraying the high viscosity liquid, whereby the high viscosity liquid is sprayed toward the windshield at the moment of a vehicle accident for bonding the windshield.

2 Claims, 2 Drawing Sheets

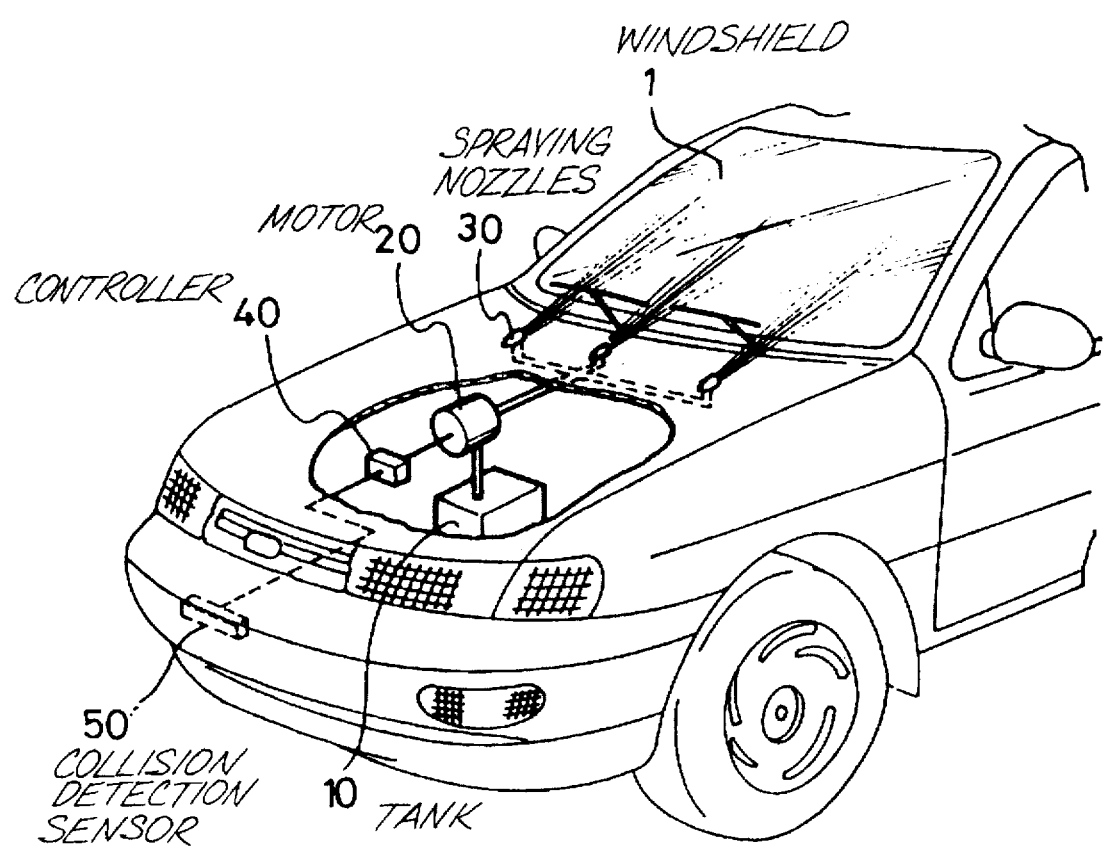

SYSTEM FOR PREVENTING SCATTERING OF FRONT GLASS PIECES DURING A VEHICLE ACCIDENT

BACKGROUND OF THE INVENTION

1. Field of the invention

The present invention relates to a system for preventing scattering of glass pieces during a vehicle accident, and in particular to an improved system for preventing scattering of glass pieces during a vehicle accident, by which it is possible to protect a driver or passengers from being injured by glass pieces which are scattered toward the driver or passengers in the vehicle.

2. Description of the Conventional Art

Generally, a windshield of a vehicle is attached to a front portion of a vehicle frame for shielding wind when the vehicle runs.

The conventional windshield is scattered in a hexagonal shape or an octagonal shape when a vehicle accident occurs, for thus protecting a driver or passengers in the vehicle from scattering glass pieces. The windshield is basically directed to shielding wind and preventing the driver and passengers when the vehicle runs. Therefore, the standardization with respect to the windshield is considered as an important design concern in the industry.

However, althogh the conventional windshield mechanism is intended for preventing the windshield from being scattered during a vehicle accident, when the vehicle collides with something, the scattering glass pieces may cause a critical damage. Particularly, if the driver or passengers did not use a safety belt and collided with the windshield it should cause more serious damage to the driver or passengers.

SUMMARY OF THE INVENTION

Accordingly, it is an object of the present invention to provide an improved system for preventing scattering of glass pieces during a vehicle accident, which overcomes the problems encountered in the conventional art.

It is another object of the present invention to provide an improved system for preventing scattering of glass pieces during a vehicle accident, which is capable of preventing scattering of glass pieces when a vehicle accident occurs, whereby it is possible to protect a driver or passengers in the vehicle from being hurt due to the scattering glass pieces.

To achieve the above objects, there is provided an improved system for preventing scattering of glass pieces during a vehicle accident, which includes a high viscosity liquid tank disposed in an engine room and filled with high viscosity liquid, a motor for pumping the high viscosity liquid from the high viscosity liquid tank, a collision detection sensor for detecting a collision of a vehicle, a controller for controlling the motor, and a plurality of spraying nozzles for spraying the high viscosity liquid supplied by the motor toward the windshield, whereby it is possible to protect a driver or passengers in the vehicle from the scattering glass pieces.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a perspective view illustrating an operational state that a system for preventing scattering of glass pieces according to the present invention is adapted to a vehicle.

DETAILED DESCRIPTION OF THE INVENTION

Figure 1:
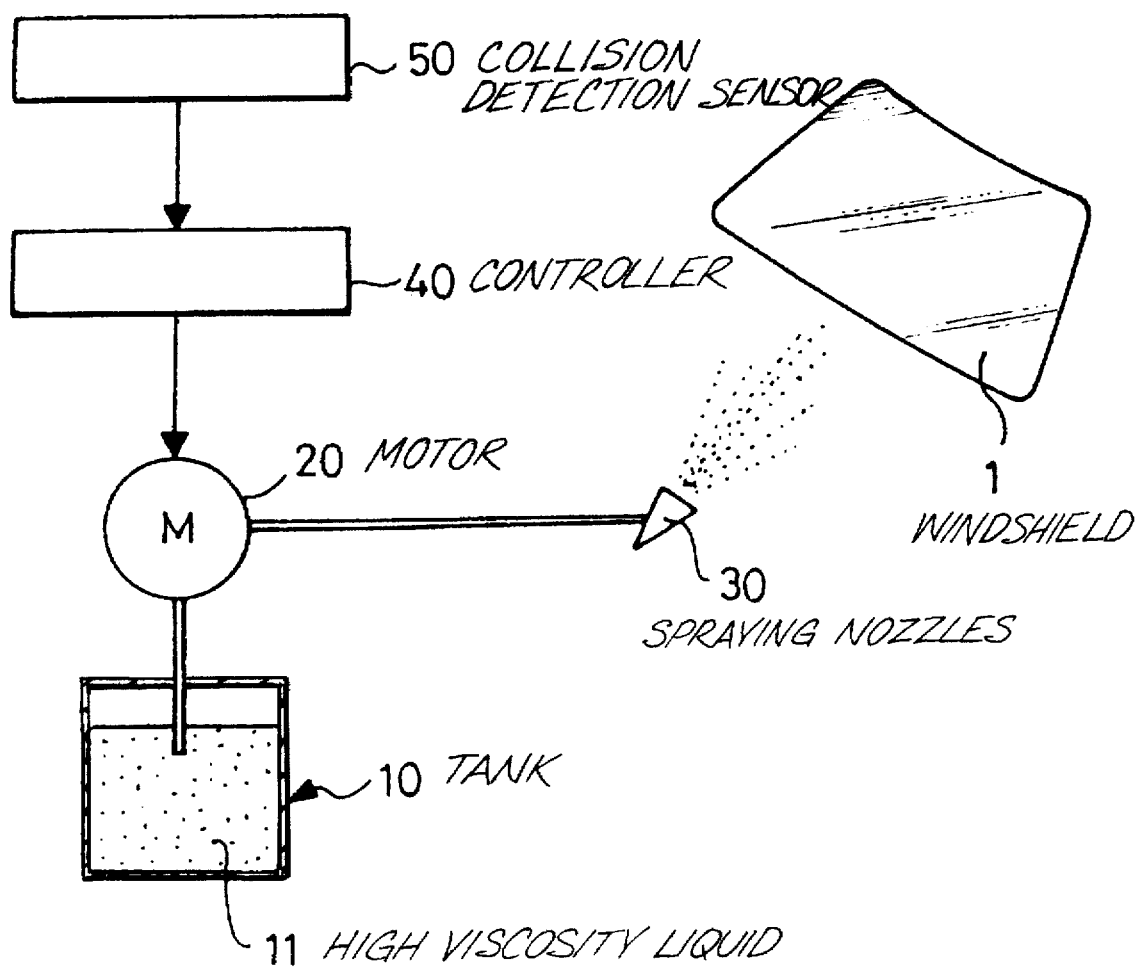
FIG. 1 is a view illustrating the construction of a system for preventing scattering of glass pieces according to the present invention.

As shown in FIGS. 1 and 2, a high viscosity liquid tank 10 in which high viscosity liquid 11 is filled is disposed in an engine room and is operated by a motor 20. A plurality of spraying nozzles 30 are disposed near a lower edge portion of a windshield 1 for spraying the high viscosity liquid 11 which is pumped and compressed by the motor 20 toward the windshield 1 when a vehicle accident occurs. A controller 40 is connected to the motor 20, and a collision detection sensor 50 is disposed in a front portion of a vehicle frame and is connected to the controller 40, so that the collision detection sensor 50 detects a collision state of the vehicle, converts the detected state into an electrical signal, and transmits the signal to the controller 40, for thus operating the motor 20 in cooperation with the controller 40.

The operation and effects of the system for preventing scattering of glass pieces according to the present invention will now be explained with reference to the accompanying drawings.

First, when a vehicle accident occurs, the collision detection sensor 50 detects the collision, converts the detected collision state into an electrical signal, and transmits the signal to the controller 40. The controller 40 causes the motor 20 to be driven, and the high viscosity liquid 11 is pumped from the high viscosity liquid tank 10 and sprayed toward the windshield 1 through the spray nozzles 30 just before the windshield is broken and scattered, for thus bonding the scattering glass pisces and preventing scattering thereof, whereby it is possible to protect the driver or passengers in the vehicle.

As described above, the system for preventing scattering of glass pieces according to the present invention is basically directed to providing a glass pieces scattering prevention system which includes the collision detection sensor, the controller, the motor, the high viscosity liquid tank, and the spray nozzles, for thus preventing scattering of glass pieces, whereby it is possible to protect the driver or passengers in the vehicle from being injured due to the scattering glass pieces.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. A system for preventing scattering of glass pieces during a vehicle accident, comprising:

a high viscosity liquid tank disposed in an engine room and filled with a high viscosity liquid;

a motor for pumping the high viscosity liquid from the high viscosity liquid tank;

a collision detection sensor for detecting a collision of a vehicle;

a controller which receives a signal from the collision detection sensor and controls the motor; and a plurality of spraying nozzles for spraying the high viscosity liquid pumped and compressed by the motor toward a windshield.

2. The system of claim 1, wherein said plurality of spraying nozzles are disposed near a lower edge portion of a windshield.

* * * * *

UNITED STATES PATENT AND TRADEMARK OFFICE
CERTIFICATE OF CORRECTION

PATENT NO. : 5,729,195
DATED : March 17, 1998
INVENTOR(S) : Jung-Koo Kang

It is certified that error appears in the above-identified patent and that said Letters Patent is hereby corrected as shown below:

Column 1, line 25, change "althogh" to -- although --.
Column 2, line 40, change "pisces" to -- pieces --.
Column 2, line 45, change "a glass pieces" to -- a glass piece --.

Signed and Sealed this

Thirty-first Day of August, 1999

Attest:

Q. TODD DICKINSON

*Attesting Officer*  *Acting Commissioner of Patents and Trademarks*